United States Patent [19]

Garcia et al.

[11] Patent Number: 4,493,150

[45] Date of Patent: Jan. 15, 1985

[54] PIPE CUTTER WITH SPLIT RING FRAME AND ENCLOSED FEEDING MEANS

[76] Inventors: Carlos M. Garcia, 225 Suunyside St., Apt. 15, Bldg. 14, Houston, Tex. 77076; I. Ely Reed, 4050 Heathersage Dr., Houston, Tex. 77084; Dale K. McLeod, 5926 Pinewilde, Houston, Tex. 77066

[21] Appl. No.: 439,411

[22] Filed: Nov. 5, 1982

[51] Int. Cl.³ ............................................. B26D 3/16
[52] U.S. Cl. ............................................ 30/97; 30/98
[58] Field of Search .................. 30/96, 97, 98, 94, 95, 30/93

[56] References Cited

U.S. PATENT DOCUMENTS

| | | | |
|---|---|---|---|
| 2,747,274 | 5/1956 | Willard | 30/97 |
| 3,253,336 | 5/1966 | Brown | 30/98 |
| 3,431,646 | 3/1969 | Young | 30/97 |
| 3,807,047 | 4/1974 | Sherer | 30/97 |
| 3,839,791 | 10/1974 | Feamster | 30/97 |
| 3,942,248 | 3/1976 | Sherer et al. | 30/97 |

*Primary Examiner*—Jimmy C. Peters
*Attorney, Agent, or Firm*—Vinson & Elkins

[57] ABSTRACT

A pipe cutter with a split ring frame attachable to a pipe. A split ring carrier assembly is rotatably mounted to the frame. The carrier assembly carries a cutter arm which in turn carries a cutter tool. The cutter arm is pivotally mounted to the carrier assembly so that it may be adjusted to cut pipe of various sizes. The feeding means for advancing the cutting tool is responsive to rotation of the carrier assembly about the frame. The feeding means is completely enclosed within the cutter arm, carrier assembly and frame.

3 Claims, 8 Drawing Figures

PIPE CUTTER WITH SPLIT RING FRAME AND ENCLOSED FEEDING MEANS

BACKGROUND OF INVENTION

The field of this invention relates to pipe cutters and bevelers, particularly portable pipe cutter and bevelers. Some prior art portable pipe cutters and bevelers are described in U.S. Pat. Nos. 2,747,274, 3,253,336, 3,431,646 and 3,807,047. Some prior art portable pipe cutters are capable of cutting pipe of various diameters.

The pipe cutters and bevelers of the prior art have several problems. One of these problems is the inability of these prior art cutters to make cuts in restricted spaces. An example of an application for a cut in a restricted space is the cutting of a typical return bend in a heat exchanger. A return bend is a 180° turn in a pipe forming a U-shape. Generally, prior to the present invention, return bend cuts were made by use of power saws as opposed to a pipe cutter because there was insufficient room to use a pipe cutter. When a cut is made by a power saw, the cut is square and has to be ground to the proper bevel. The combined downtime for the sawing and beveling operations was quite lengthy and hence unsatisfactory.

One of the reasons why the prior art pipe cutters are not used to make cuts of return bends is that the feeding means for advancing the cutting tools on the prior art cutters requires significant space to operate, and in cutting return bends there is not the necessary space. Many of the prior art pipe cutters have components of the feeding means mounted in the outer periphery of the cutter. By mounting components of the tool feeding means on the outer periphery of the cutter, the ability for the cutter to work in limited space is significantly reduced. On the other hand, without these components mounted on the outer periphery of the cutter, the cutter would not operate.

Another limitation of prior art cutters arises from components of the feeding means being subject to gualling by pipe cuttings. As a pipe is cut, cuttings are made and fall from the pipe. The hardness of these cuttings vary and depend upon the hardness of the pipe. All prior art cutters are subject to having these cuttings fall and collect in the feeding means for advancing the cutting tool. Indeed, many prior art cutters have as a component of the feeding means a wheel which travels along the exterior of the pipe during cutting operations. This wheel is particularly vulnerable to being exposed to cuttings. The operator of the prior art cutters must constantly monitor the tool so as to be sure that pipe cuttings do not collect and interfere with the feeding means. Often this requires shutting down the tool and cleaning the tool prior to completing the cut. Again, this results in increase down-time and inefficient operation.

Another problem with prior art cutters concerns the adjustments which are made to the cutter in converting the cutter from cutting pipe of one size to cutting pipe of another size. Generally, significant adjustments of the cutters and the cutting tool are necessary in order to convert the cutter from cutting pipe of one size to cutting pipe of another size. These adjustments are often cumbersome and time consuming and hence inefficient.

SUMMARY OF INVENTION

This invention is directed to a pipe cutter and beveler which can be adjusted to cut pipe of various sizes, which has a feeding means for advancing the cutting tool which is completely isolated from chips and cuttings made during cutting operations, and which can be used to make cuts in restricted space. The pipe cutter of the present invention includes a split ring frame, means for attaching the split ring frame to a pipe, a split ring carrier gear rotatably mounted to the frame, a cutter arm which is pivotally attached to one of the carrier gear rings, a cutting tool which is movably mounted in the cutter arm in the radial direction, and feeding means for advancing the cutting tool in the radial direction as the carrier gear rotates about the frame, said feeding means being completely enclosed and sealed within the cutter arm, frame and carrier gear thereby precluding any chips or cuttings from the pipe cutting operations interfering or galling the components of the feeding means. The feeding means includes a feed gear which is mounted to the frame, a shaft for rotatably attaching the cutter arm to the carrier gear, a feed pinion gear which is mounted to the shaft and which is rotated by the feed gear as the carrier gear rotates about the frame, and transmission means for converting the rotation of the feed pinion gear and shaft into radial movement of the cutting tool. The entire feeding means is located interiorly of the outer periphery of the frame and carrier gear and exterior of the inner periphery of the frame and carrier gear.

An object of this invention is to provide a portable pipe cutter and beveler which is adjustable to cut pipe of various sizes, which is capable of cutting pipe in a minimum of operating space, and which has a feeding mechanism that is isolated from chips and cuttings made during the operation of the pipe cutter.

Another object of this invention is to provide a cutter which has its feeding means located interior of the outer periphery of the frame and tool carier and exterior of the inner periphery of the frame and tool carrier.

An object of this invention is to provide a pipe cutter and beveler which is particularly well adapted to cutting and beveling pipe where there is a minimum of operating room, such as in a return bend.

Another object of this invention is to provide a pipe cutter and beveler which has a feed means for feeding the cutting tool which feed means is protected from pipe cuttings.

Still yet another object of this invention is to provide a pipe cutter and beveler which is adapted to cut and bevel pipe in a return bend and which has feeding means for feeding the cutting tool into the pipe and means for protecting the feeding means from pipe cuttings.

A further object of the invention is to provide a pipe cutter and beveler which has a 360° bearing surface which is self lubricating and which has no metal to metal contact on the bearing surface.

Another object of this invention is to provide a portable pipe cutter and beveler which is adjustable to cut pipe of various sizes and which has a feeding mechanism that is isolated from all cuttings and chips made from operating the tool.

Another object of this invention is to provide a lightweight relatively efficient pipe cutter and beveler which is portable which is fast in operation and will save time and labor and expense in cutting pipes.

Other objects and advantages of this invention will be apparent from the following description taken together with the drawing.

DESCRIPTION OF PREFERRED EMBODIMENT

The preferred embodiment of the present invention is generally comprised of a split ring frame, a split ring carrier gear rotatably mounted to the frame by bearing means, a feed gear mounted to the frame, a cutter arm pivotally mounted to one of the carrier gear rings, a cutting tool mounted on the cutter arm and movable in a radial direction, and feeding means for advancing a cutting tool in the radial direction and housed primarily in the cutter arm, the feeding means activated by rotation of the carrier gear about the frame and the feed gear. The preferred embodiment also includes an extension on the frame for mounting the drive for the tool and switching means for engaging and disengaging the feeding means.

Figure 2:
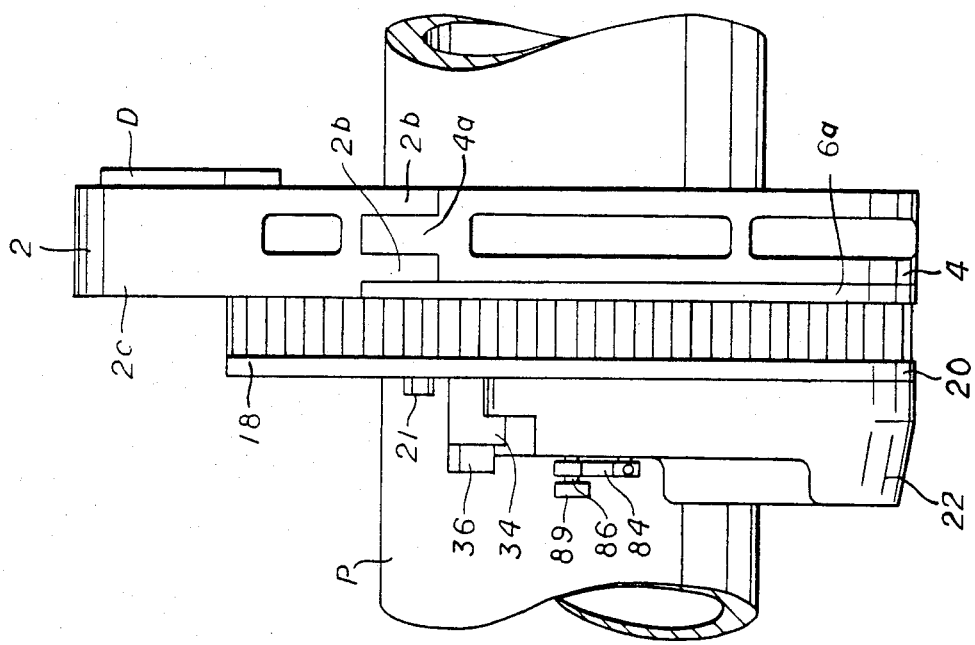
FIG. 2 is a side view of the pipe cutter and beveler of FIG. 1.
Figure 3:
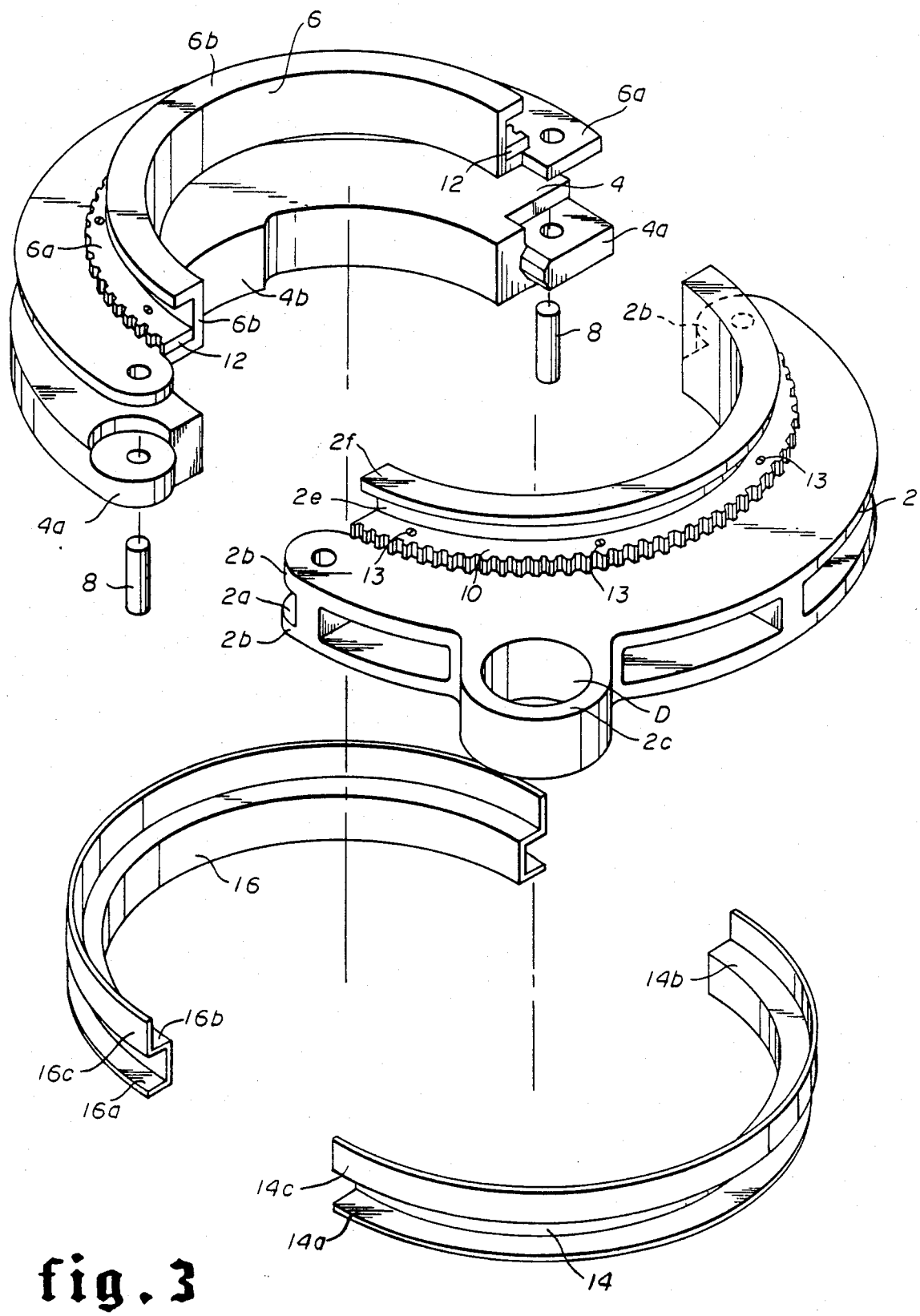
FIG. 3 is an exploded view of the frame, bearings and feed gear parts of the FIG. 1 pipe cutter and beveler.

As shown in FIGS. 2 and 3, the split ring frame is comprised of a top frame 2, a bottom frame 4, and lower bearing frame 6, with both the top frame 2 and the bottom frame 4 being web members. The top frame 2 is a half ring member. The top frame 2 has on each of its ends a groove 2a between shoulders 2b. Each of these shoulders 2b has a bolt hole for use in connecting the top and bottom frames together.

The top frame 2 includes a radially outward extending member 2c for supporting the drive means which drives the pipe cutter. The drive means can be any of a large number of conventional drive sources. The drive means is not illustrated in the Figures; however, the letter D in the Figures designates the space where the drive means can be attached to the member 2c.

Figure 1:
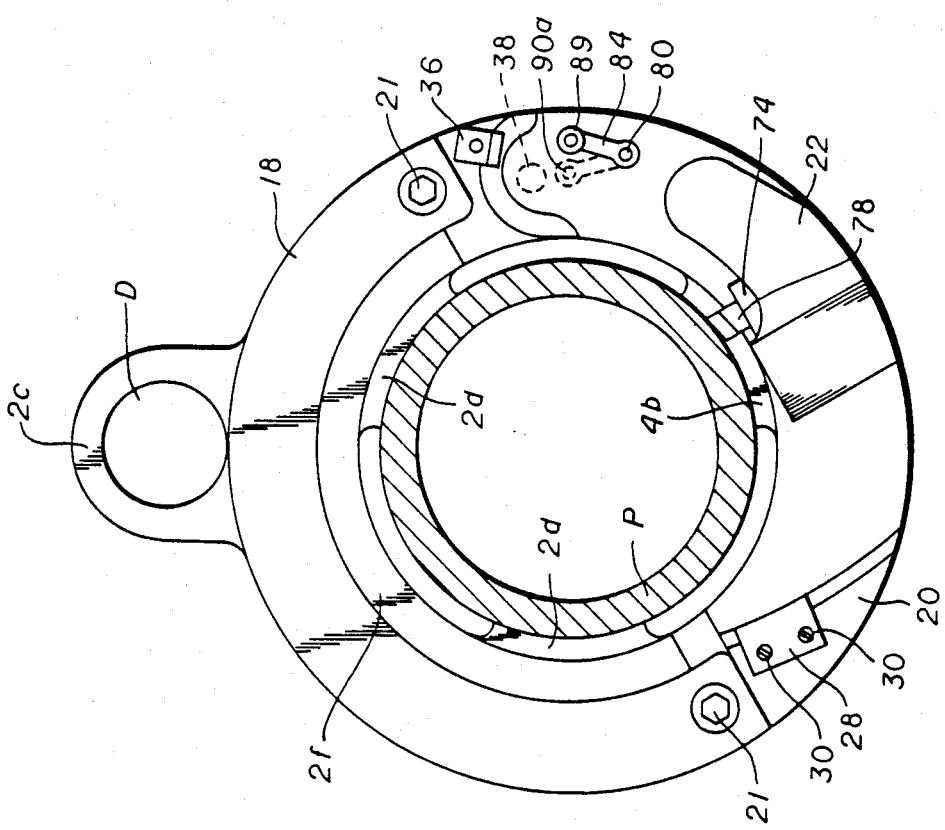
FIG. 1 is a front view of the pipe cutter and beveler in position to cut pipe P.

As illustrated in FIG. 1, the top frame 2 has internal pads 2d for engaging the exterior of pipe P. The top frame member 2 also includes an axially extending shoulder 2e with a flange 2f connected to the end of shoulder 2e. Shoulder 2e and flange 2f can be seen in FIG. 3. The shoulder 2e and flange 2f together with the main body of the top frame 2 form a U-shaped cross-section channel which will retain a bearing member as will be set forth herein.

The bottom frame 4 is a half-ring member having a tongue member 4a on each of its ends with each tongue member having a bolt hole in its for use in connecting the frames together. As shown in FIG. 1, the bottom frame also has an internal pad 4b for engaging the exterior of the pipe P.

As shown in FIG. 3, the lower bearing frame 6 is a half ring member having a J-shaped cross-section formed by flanges 6a and 6b. The flange 6a has bolt holes at each of its ends corresponding with the bolt holes in tongue members 4a.

The top frame 2, bottom frame 4, and lower bearing frame 6 are connected together by bolts or pins 8 which are inserted into the holes in shoulders 2b, tongues 4a, and flange 6a. When connected together, the pads 2d and 4b securely engage the pipe P thereby securing the pipe cutter to the pipe P.

As shown in FIG. 3, the feed gear is a split ring member comprised of a top feed gear ring 10 and bottom feed gear ring 12. Each of these feed gear rings has a plurality of gear teeth projecting radially outward. The feed gear ring 10 can be attached to top frame 2 by any number of conventional methods, such as by screws 13, as shown in FIG. 3. The feed gear ring 12 can be attached to shoulder 6a of bottom bearing frame 6 by any number of conventional methods, such as by screws, but the method used is not illustrated in the Figures. Since the feed gear rings are fastened to the frame, the feed gear ring is stationary relative to movement of the carrier gear rings about the frame.

The bearing for supporting the carrier gear rings includes a top bearing member 14 and a bottom bearing member 16. The bearing members 14 and 16 provide a 360° bearing surface for the carrier gear rings. Both top bearing member 14 and bottom bearing member 16 can be made from any number of materials which are generally used for bearing materials, but it has been found that bearing materials made of Nylatron are particularly well suited for supporting the carrier gear rings. The top bearing member 14 has a U-shaped cross section formed by radially outward extending flanges 14a and 14b. The top bearing member 14 also includes an axially extending shoulder 14c at the end of flange 14b. The top bearing member 14 fits into the U-shaped cross-section channel of top frame 2 between the top feed gear ring 10 and flange 2f, with flange 14a abutting the top feed gear 10, flange 14b abutting flange 2f, and shoulder 14c abutting the end of flange 2f. Similarly, the bottom bearing member 16 has generally a U-shaped cross section formed by radially outward extending flanges 16a and 16b. The bottom bearing member 16 also includes an axially extending shoulder 16c at the end of flange 16b. The bottom bearing member 16 fits into the J-shaped cross-section of bottom bearing frame 6 with flange 16a abutting the side of bottom feed gear 12, flange 16b abutting flange 6b, and shoulder 16c abutting the outwardly extending end of flange 6b. The bearing members 14 and 16 can be affixed to top frame 2 and bearing frame 6 respectively by any number of conventional methods, such as by screws, and the means used to affix these bearing members is not illustrated in the Figures. The bearing members 14 and 16 provide a 360° bearing surface for rotation of the carrier gear ring about the frame.

Figure 4:
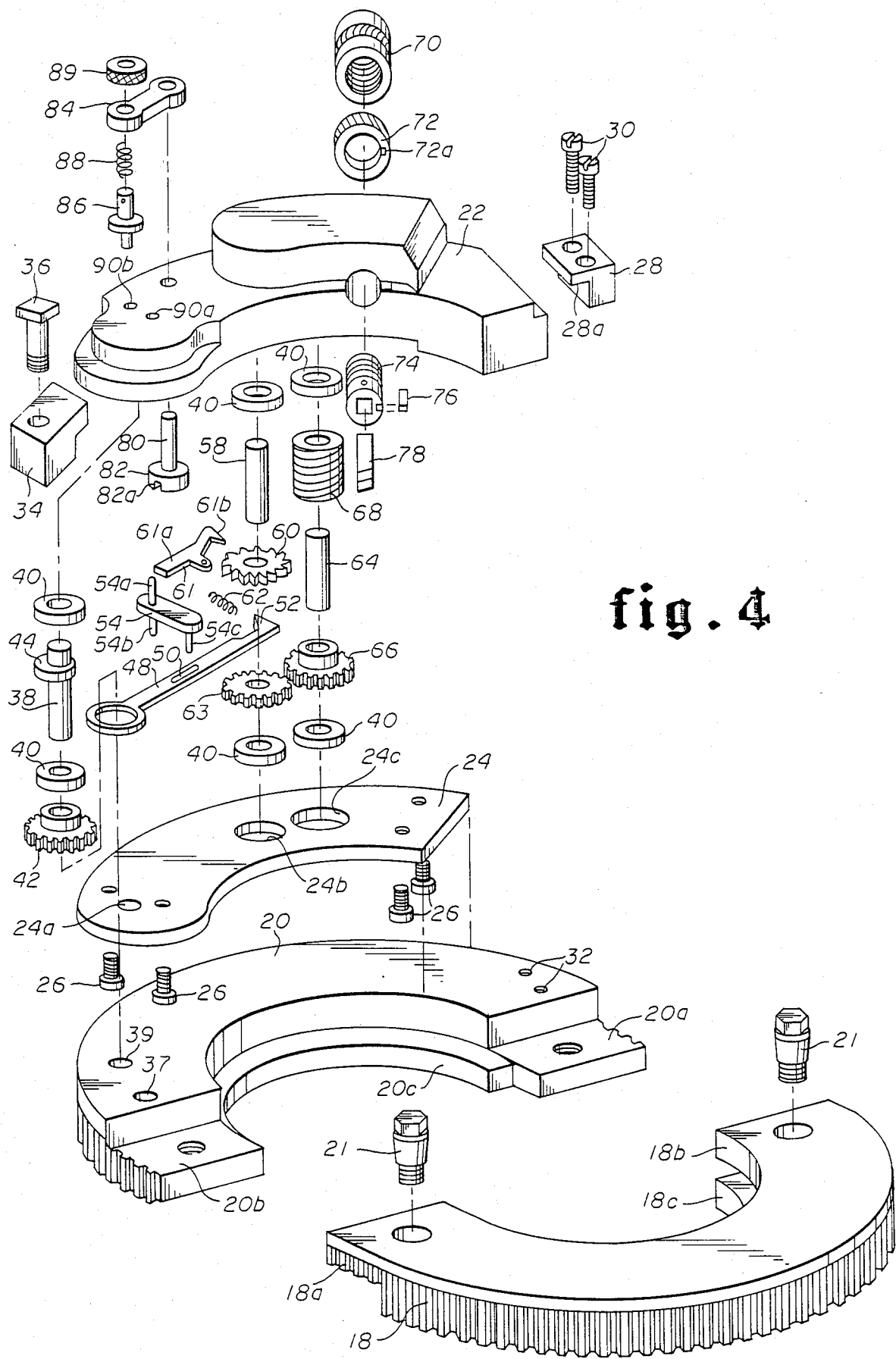
FIG. 4 is an exploded view of all other parts of the pipe cutter and beveler of FIG. 1 which parts are not shown in FIG. 3.

As shown in FIG. 4, the split carrier gear ring is comprised of top carrier gear member 18 and bottom carrier gear member 20. Both the carrier gear members 18 and 20 are split ring members each having a plurality of radially outward extending gear teeth. The teeth of the carrier gear mesh with the teeth of a gear which is driven by the drive motor. The top carrier gear member 18 has tongues 18a and 18b on each end of the split ring, with each of these tongues having an axially aligned bolt hole. The top carrier gear member 18 has a radially inward extending rib 18c which fits into and rides in the U-shaped cross-section of bearing members 14 and 16 as the carrier gear member 18 rotates about the frame. Part of this rib 18c is depicted in FIG. 4. The bottom carrier gear 20 has tongues 20a and 20b on each end of the split ring, with each of these tongues having an axially aligned bolt hole. The bottom carrier gear member 20 has a radially inward extending rib 20c which fits into and rides in the U-shaped cross-section of bearing members 14 and 16 as carrier gear member 20 rotates about the frame. This rib 20c is illustrated in FIG. 4. When placed together, the tongues 18a and 18b of top carrier gear member 18 fit over the tongues 20a and 20b of bottom carrier gear member 20, with the bolt holes of these members aligned with each other. The top and bottom carrier gear members 18 and 20 are connected by bolts 21 inserted through the bolt holes in the tongues of these members.

The bottom carrier gear 20 carries the cutting tool and the feeding means for advancing the cutting tool in the radial direction. The cutting tool and primarily all of the feeding means for the cutting tool are housed within cavities in cutter arm 22 and are enclosed within the cavities by cutter arm cover 24. The components of the feeding means for the cutting tool for the preferred embodiment are shown in an exploded view of FIG. 4, with the broken lines indicating the relative position of each element when the unit is assembled.

The cutter arm 22 and the cutter arm cover 24 are connected to each other by means of screws 26. One end of cutter arm 22 is attached to bottom carrier gear 20 by attaching clamp 28 to bottom carrier gear 20 with screws 30 fitting into screw holes 32, with the under lip 28a of clamp 28 retaining the end of cutter arm 22. The other end of cutter arm 22 is attached to bottom carrier gear 20 by clamp 34 and screw 36 which screws into screw hole 37 on bottom carrier gear 20.

Shaft 38 is rotatably mounted in hole 39 in bottom carrier gear member 20 and in the cutter arm 22 by means of conventional ball bearing assemblies 40. Hole 39 extends completely through bottom carrier gear member 20. When assembled one end of shaft 38 extends completely through both hole 24a of cutter arm cover 24 and hole 39 of carrier gear member 20, with the end of shaft 38 extending towards the frame members 2 and 4, and on that end of shaft 38 is mounted feed pinion gear 42. The gear teeth of feed pinion gear 42 mesh with the teeth of feed gear rings 10 and 12. As will be discussed in more detail herein, as the tool carrier assembly rotates about the frame, the feed pinion gear 42 rotates about the relatively stationary feed gear rings 10 and 12 thereby resulting in rotation of feed gear 42 and shaft 38. Eccentric enlargement 44 is attached to shaft 38.

Figure 8:
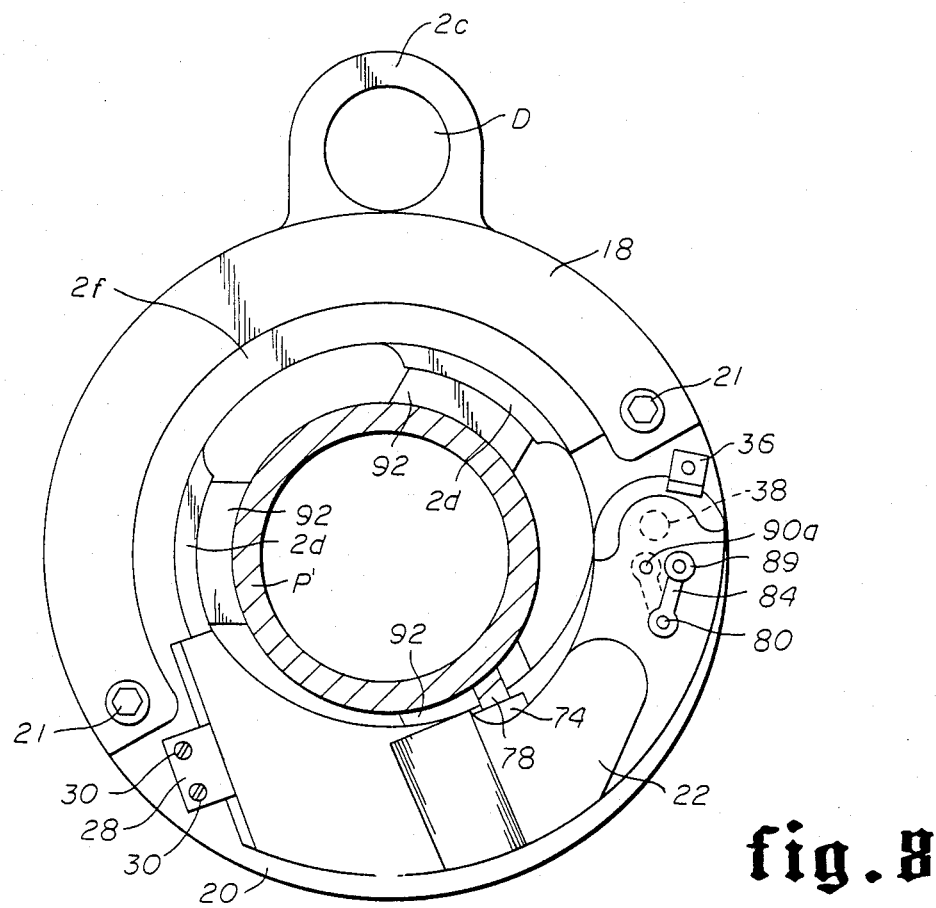
FIG. 8 is a front view of the pipe cutter and beveler cutting pipe P' which is of smaller outer diameter than pipe P.

The shaft 38 also provides a means for pivotally attaching the cutter arm 22 to the bottom carrier gear 20. When the clamps 28 and 34 are not attached, the cutter arm 22 can pivot about shaft 38. This pivoting permits the cutting tool which is housed in the cutter arm 22 to be adjusted to cut various size pipes. FIG. 8 shows the cutter arm 22 having pivoted about shaft 38 so as to cut pipe P'.

Figure 5:
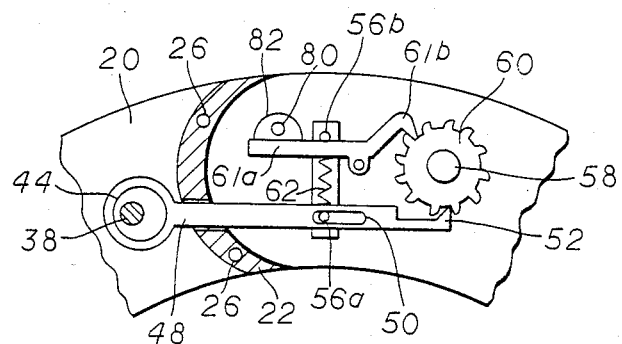
FIG. 5 is a view of the ratchet push bar and locking means of the feeding means with the locking means activated.
Figure 6:
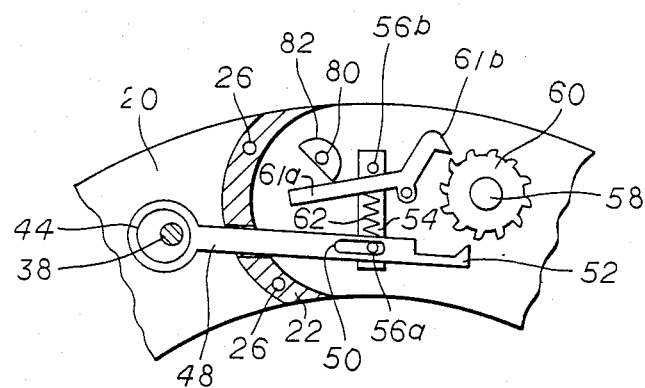
FIG. 6 is a view of the ratchet push bar and locking means of the feeding means with the locking means deactivated.
Figure 7:
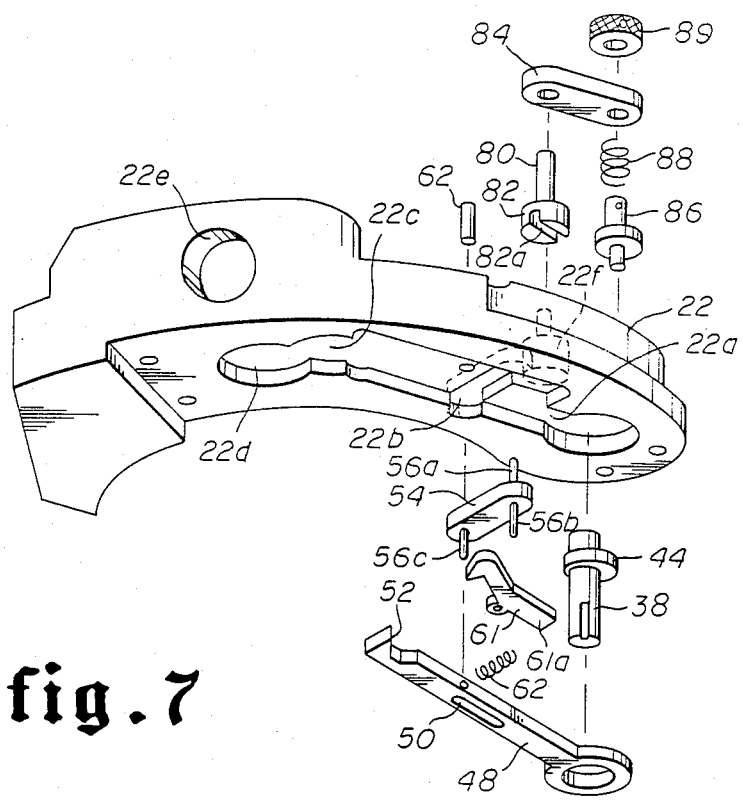
FIG. 7 is an exploded view of the underside of the cutter arm and part of the feeding means.

As can be seen in FIGS. 5 and 6, the feeding means includes a flat ratchet push bar 48 which serves as a means for incrementally advancing the cutting tool. One end of ratchet push bar 48 is attached to the eccentric enlargement 44 of shaft 38. Ratchet push bar 48 is an elongated member which acts like a piston rod in the gear train of the preferred embodiment. Ratchet push bar 48 includes a longitudinal slot 50 at its midsection and a finger 52 at one end. As illustrated in FIG. 7, ratchet push bar 48 is housed in cavity 22a of cutter arm 22.

It should be noted that FIG. 7 does not include all of the elements of the feeding means as illustrated in FIG. 4. Rather, FIG. 7 is included for showing the cavities in cutter arm 22, the ratchet push bar assembly, and the elements of the switching means.

The ratchet push bar 48 is mounted in part on support assembly 54. Support assembly 54 is depicted in FIGS. 4 and 7. The support assembly 54 has a pin 56a from one side and two pins 56b and 56c extending from another side. Ratchet push bar 48 is supported by assembly 54 by means of pin 56c of assembly 54 extending into slot 50 of ratchet push bar 48.

The support assembly 54 is movably mounted into an eliptical cavity 22b in cutter arm 22. The eliptical cavity 22b is larger than support assembly 54 so that the support assembly 54 can slide in the cavity 22b in a longitudinal direction from a first position to a second position. As will be set forth herein, as shaft 34 rotates, eccentric enlargement 44 will also rotate causing the end of the ratchet push bar 48 attached to the enlargement 44 to rotate. However, pin 56c of support assembly 54 in slot 50 of ratchet push bar 48 will act as a means for converting this rotational movement of one end of ratchet push bar 48 into primarily longitudinal movement of the other end of ratchet push bar 48.

Shaft 58 is rotatably mounted by conventional bearing means 40 to the cutter arm cover 24 and cutter arm 22. One of the conventional bearing means 40 is mounted in hole 24b of cutter arm cover 24. Similarly, the other conventional bearing means 40 for shaft 38 is mounted in a cavity 22c in the cutter arm 22. The cavity 22c is identified in FIG. 7.

Gear 60 is attached to shaft 58. As can be seen in FIGS. 5 and 6, gear 60 has a plurality of outwardly extending teeth with each tooth having the shape of a right angle trapezoid. The gear 60 is positioned so that the end of the finger 52 of ratchet push bar 48 abuts the right angle side of one of the teeth of gear 60. As will be set forth in more detail herein, as the ratchet push bar 48 moves longitudinally outward away from shaft 38 as shaft 38 rotates, the end of the finger 52 will push the right angle side of one of the teeth of gear 60 thereby causing the gear 60 to rotate. As the ratchet push bar moves longitudinally toward the shaft 38 as the shaft 38 rotates, the end of finger 52 will slide over the side and top of a tooth of gear 60.

The cutter also includes a locking means for locking the gear 60 as the ratchet push bar 48 advances the gear 60. The locking means includes a pivotally mounted flat locking hook 61 with a longitudinally extending member 61a which is positioned under pin 56b of support assembly 54 and a finger 61b for latching the right angle side of a tooth of gear 60 as illustrated in FIG. 5. The locking hook 61 is attached to cutter arm 22 by pin 62, and locking hook 61 is pivotable about pin 61. The locking means also includes spring 63 which ends are attached to member 61a and ratchet push bar 48. The spring 63 is in compression in this position and therefore preferentially urges the locking hook 61 into engagement with a right angle side of one of the teeth of gear 60.

Gear 63 is also attached to shaft 58. Gear 63 has a plurality of outwardly extending teeth. Gear 63 rotates in response to rotation of shaft 58 caused by the rotation of gear 60.

Shaft 64 is rotatably mounted by conventional bearing means 40 to cutter arm cover 24 and cutter arm 22. One of the conventional bearing means 40 is mounted in hole 24c of cutter arm cover 24. Similarly, the other conventional bearing means 40 for shaft 64 is mounted in a hole in the cutter arm 22.

Gear 66 is mounted to shaft 64. Gear 66 has a plurality of teeth that mesh with the teeth of gear 63 thereby providing a means for transmitting rotation of gear 63 to gear 64. Worm gear 68 is also mounted to shaft 64 and rotates in response to rotation of shaft 64. The shaft 64, gear 66 and worm gear 68 are housed in cavity 22d of cutter arm 22, and cavity 22d can be seen in FIG. 7.

Worm gear nut 70 is adjacent to worm gear 68 when the unit is assembled. Worm gear nut 70 is rotatably mounted in cavity 22e of cutter arm 22 by means of a retaining nut 72, the retaining nut 72 providing a bearing surface on which worm gear nut 70 can rotate. The cavity 22e can be seen in FIG. 7. Retaining nut 72 can be fixably mounted in cutter arm 22 by any number of conventional methods. Worm gear nut 70 has external threads that mesh with the threads of worm gear 68 thereby allowing transmission of rotation of the worm gear 68 to worm gear nut 70.

Tool holder 74 has a generally cylindrical exterior with external threads that mesh with internal threads of worm gear nut 70. Tool holder 74 has a passageway for receiving key 76 which is attached to retaining nut 72 in groove 72a. Tool holder 74 includes means for retaining the cutting tool 78. The key 76 which is attached to retaining nut 72a provides a means for converting the rotational movement of worm gear nut 70 into vertical movement of the tool holder 74 and cutting tool 78.

The feeding means described herein is but one example of the feeding means which could be used and fall within the scope of this invention. By way of example but not limitation, gears could be substituted for the ratchet push bar 48 yet fall within this invention's scope.

The cutter includes switching means for releasing the locking means. As will be set forth herein, when the locking means has been released, the cutting tool will not advance radially into the surface being cut. The switching means includes a shaft 80 which is rotatably mounted in cavity 22f of cutter arm 22. As can be seen in FIG. 4, at one end of the shaft is a cylindrically enlargement 82 having a groove 82a at the end of the enlargement. When the cutter is assembled, groove 82a fits over pin 56b of support assembly 54.

Lever 84 is attached to the upper end of shaft 80. Pin 86 is attached to one end of lever 84 and is preferentially urged downward by spring 88. Knob 89 is also attached to the end of lever 84. The end of pin 86 can be set in either hole 90a or 90b. The pin 86, spring 88 and knob 89 are attached so that by pulling up on knob 89, pin 86 will be pulled completely out of hole 90a or 90b.

When the pin 86 is in hole 90a, the locking means is activated thereby allowing rotational advancement of gear 60 and the cutting tool 78. The locking hook 61 is in the FIG. 5 position. When the lever 84 is moved and the pin 86 is placed in hole 90b, then the shaft 80 will be rotated resulting in rotation of enlargement 82. As enlargement 82 is rotated, the support assembly 54 slides in cavity 22b from its first position to its second position as a result of the pin 56a being in groove 82a of enlargement 82. As support assembly 54 slides from a first position to a second position, the ratchet push bar 48 is pushed out of engagement with gear 60 and the locking hook 61 is pivoted out of engagement with gear 60. This may be seen in FIG. 6. With the locking hook 61 and the ratchet push bar 48 in the FIG. 6 position, the cutting tool 78 cannot be advanced as the carrier gear rings 18 and 20 rotate about the frame.

As can be seen from the foregoing description of the preferred embodiment of the present invention together with the accompanying drawings, the entire feeding means for the cutter is located internally of the outer periphery of the carrier gear and frame. Further, the feeding means is isolated from any chips which are made during cutting operations. Additionally, the entire feeding means is located exterior of the inner periphery of the cutter.

The present invention is adjustable so as to cut pipe of smaller outer diameter than the pipe P illustrated in FIG. 1. As shown in FIG. 8, the present invention can be adjusted by adding pads 92 to act as spacers between the pads 2d and 4b and the exterior of the pipe P'. The pads 92 may be attached to pads 2d and 4b by any of a large number of conventional methods, such as bolts. The method used is not shown in the Figures.

With the pads 92 firmly engaging the exterior of the pipe P', the clamps 28 and 34 may be loosened thereby freeing the cutter arm 22 to pivot about shaft 38 relative to bottom carrier gear 20 until cutting tool 78 is placed in the desired position for cutting pipe P'. When placed in that position, the clamps 28 and 34 are tightened, locking the cutter arm 22 in the position.

OPERATION

The top and bottom frames 2 and 4 are connected around the pipe to be cut by pins or bolts 8. The frames 2 and 4 have the bearing frame 6, the feed gear rings 10 and 12, and the bearing members 14 and 16 already attached. The top and bottom carrier gear members 18 and 20 are then mounted on the bearing members 14 and 16 and the carrier gear members 18 and 20 are connected to each other by bolts 21. The cutting arm is already attached to the bottom carrier gear member 20.

With the pipe cutter in position, the cutter arm 22 is pivoted about shaft 38 until cutting tool 78 is in the desired cutting position. Once in that position, clamps 28 and 34 are tightened locking cutting arm 22. The switching means is set so that the cutting tool 78 will feed radially as the carrier gear rings rotate about the frame.

The drive motor is then activated. The drive motor rotates a gear which meshes with the external teeth of carrier gear members 18 and 20 causing the carrier gear members 18 and 20 to rotate relative to the top and bottom frame 2 and 4. As carrier gear members 18 and 20 rotate, the teeth of the feed pinion gear 42 meshes with the teeth of feed gear rings 10 and 12 thereby causing feed pinion gear 42 to rotate relative to the feed gear rings 10 and 12. As feed pinion gear 42 rotates, shaft 38 rotates resulting in rotation of eccentric enlargement 44. The rotation of eccentric enlargement 44 results in a longitudinal movement of finger 52 ratchet push bar 48. With the locking means set, the longitudinal movement of the push bar will incrementally rotate gear 60. Rotation of gear 60 rotates shaft 58 and attached gear 63. Rotation of gear 63 will rotate gear 66, shaft 64 and worm gear 68. As worm gear 68 rotates, the worm gear nut 70 rotates advancing cutting tool 78.

The rotation of the carrier gear rings about the frame results in both rotating and advancing the cutting tool 78 until it has made the cut. The finished cut can be made so as to have the desired bevel thereby avoiding a separate beveling step.

Having now described the invention, many modified embodiments will readily occur to those skilled in the art. In so far as those modifications do not depart from the spirit and scope of the invention described herein, they are intended to be embraced by the claims in their broadest construction.

I claim:

1. An apparatus for cutting pipe comprising a split ring frame;

means for attaching the frame to a pipe;

a split ring carrier rotatably mounted to the frame;

means for driving the split ring carrier about the frame;

a cutter arm;

means for pivotally attaching the cutter arm to one of the carrier rings;

a cutting tool movably attached to the cutter arm so that the cutting tool can move in the raidal direction relative to the pipe being cut;

feeding means for advancing the cutting tool towards the center of the pipe being cut, the feeding means being mounted in the cutting arm, frame and carrier so that the entire feeding means is interior of the outer periphery of the frame and carrier and exterior of the inner periphery of the frame and carrier, the feeding means being activated by rotation of the split ring carrier relative to the frame, said feeding means including a shaft which is rotatably attached to one of the carrier gear rings and the cutter arm, said shaft providing the means for pivotally attaching the cutter arm to one of the carrier rings;

a split feed gear ring with a plurality of outwardly projecting teeth mounted to the frame; and a feed pinion gear with a plurality of outwardly projecting teeth attached to the shaft, the teeth of said feed pinion gear meshing with the teeth of the feed gear ring as the split ring carrier rotates about the split ring frame.

2. The apparatus claimed in claim 1 including switching means for activating and deactivating the feeding means.

3. An apparatus for cutting pipe comprising a split ring frame;

means for attaching the split ring frame to the pipe;

a feed gear mounted to split ring frame, said feed gear having a plurality of outwardly extending teeth;

a split ring carrier member rotatably mounted to the split ring;

bearing means for rotatably mounting the split ring carrier to the split ring frame;

a cutter arm;

a shaft with one end rotatably mounted to the cutter arm and another part of the shaft rotatably mounted in the split ring carrier member thereby allowing the cutter arm to pivot relative to the split ring carrier member so as to provide a means for adjusting the apparatus to cut pipe of various sizes;

means for attaching the cutter arm to the split ring carrier member;

a feed pinion gear mounted on one end of the shaft, said feed pinion gear having a plurality of outwardly extending teeth that mesh with the teeth of the feed gear as the split ring carrier gear member rotates relative to split ring frame, the meshing of the feed pinion gear teeth and the feed gear teeth resulting in rotation of the shaft;

a cutting tool movably mounted on the carrier arm so that the cutting tool can move in the radial direction relative to the pipe; and feeding means for moving the cutting tool in the radial direction of the center of the pipe, the feeding means being responsive to rotation of the shaft, said feeding means being housed in the cutter arm.

* * * * *